Patented July 30, 1946

2,404,929

UNITED STATES PATENT OFFICE 2,404,929

VINYL ESTERS

Raymond B. Seymour, Dayton, Ohio, assignor to Monsanto Chemical Company, a corporation of Delaware No Drawing. Application July 8, 1943,
Serial No. 493,863

17 Claims. (Cl. 260—67)

The present invention relates to new compositions of matter, more particularly to vinyl esters of halogenated beta-formylacrylic acids and to a method of producing the same.

This invention has as an object the provision of useful, new esters of halogenated beta-formylacrylic acids. A further object is the preparation of new compounds possessing potent lachrymatory properties. Another object is the preparation of new polymerizable vinyl esters. Still another object is the provision of new, non-inflammable and solvent resistant polymers and copolymers for use in the plastic and coating industries.

These objects are accomplished by the following invention wherein there are prepared vinyl esters of halogenated beta-formylacrylic acids having the general formula:

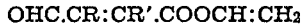

OHC.CR:CR'.COOCH:CH$_2$ wherein substituents R and R' may be, respectively, Cl and Cl, Br and Br, Cl and Br, Br and Cl, H and Br, H and Cl, Br and H, Cl and H. As examples of compounds having the above general formula may be mentioned vinyl mucochlorate, vinyl mucobromate, vinyl alpha-chloro-beta-bromo-beta-formylacrylate, vinyl alpha-bromo-beta-chloro-beta-formylacrylate, vinyl alpha-chloro-beta-formylacrylate, vinyl beta-chloro-beta-formylacrylate, vinyl alpha-bromo-beta-formylacrylate, vinyl beta-bromo-beta-formylacrylate. Vinyl esters having the above general formula are readily obtainable by reaction of the corresponding free acids with a vinyl ester of a lower saturated aliphatic carboxylic acid, for example, vinyl formate, vinyl acetate, and vinyl propionate. Vinyl aliphatic carboxylic acid esters boiling below 150° C. are preferred since they may easily be separated from the product.

The free acids from which the present new vinyl esters are prepared are halogenation products of furfural or alpha-furoic acid, which compounds are readily available on a large scale and form a cheap initial raw material for the preparation of the present highly valuable vinyl esters. Mucochloric acid, OHC.CCl:CCl COOH, for example, is readily made by reaction of furfural with hydrochloric acid and manganese dioxide (Simonis Ber. 32, 2085). Both mucochloric acid or the corresponding bromine compound, mucobromic acid can also be prepared by rapid treatment of aqueous alpha-furoic acid with chlorine or bromine. The corresponding mono-halogenated compounds are likewise obtained by reaction of alpha-furoic acid with a halogenating agent such as HCl and an oxidizing agent. Treatment of beta-chloro-alpha-furoic acid with water and bromine yields the mixed halogenated product, chlorobromo-beta-formylacrylic acid (Hill and Jackson, American Chemical Journal 12, 37).

The present vinyl esters of halogenated beta-formylacrylic acids are characterized by their strong lachrymatory action. They are pale yellowish or colorless liquids that readily volatilize to yield vapors which induce involuntary lachrymation when present in even very low concentrations. They differ essentially from the known "tear gases" in that they are substantially odorless and have a delayed action. While many of the prior lachrymators possess easily recognizable pungent odors, the present esters are not identifiable thereby. The delayed action of the present lachrymators is surprising; usually as much as ten minutes will elapse before their presence becomes evident through a sudden, copious flow of tears. Smarting and watering of the eyes do not cease when the person affected leaves the gassed area. Even a momentary exposure to the present esters brings about irritation of the eyes which persists from thirty minutes to one hour after exposure. The violent, induced lachrymation is followed by vertigo, physical debility and shock.

When compared with the known, generally used chloro-acetophenone, the present lachrymators have been found to be more volatile, more persistent and potent in effect. Moreover, chloroacetophenone, being a solid, cannot be employed as readily as the present compounds which are liquid and may therefore be more easily applied by spraying.

The present vinyl esters of halogenated beta-formylacrylic acids are likewise of much interest as new monomeric vinyl esters for the plastics industry. They polymerize readily at moderate temperatures in the presence or absence of a catalyst of polymerization to yield hard, very high melting resins that are characterized by a high degree of non-inflammability and by insolubility in all the usual organic solvents such as dioxane, benzene, alcohol, gasoline, ethylene dichloride, acetone, carbon tetrachloride and ethyl acetate. The present vinyl esters also form copolymers with other polymerizable compounds, for example, with acrylonitrile or methyl methacrylate to yield resinous products of improved thermal characteristics.

While a number of esters of mucochloric acid are known, as far as I have been able to ascertain the only previously known ester of mucochloric acid with an unsaturated alcohol is allyl mucochlorate which has been prepared by Simonis (Ber. 34, 519) by reaction of mucochloric acid with allyl alcohol. Allyl mucochlorate differs essentially from the present vinyl esters of halogenated beta-formylacrylic acid in that it does not polymerize under usual polymerizing conditions. I have prepared allyl mucochlorate according to the method of Simonis and have found that this ester possesses some lachrymatory action, which fact was also observed by Simonis. The present vinyl esters, however, far exceed allyl mucochlorate in potency with respect to this property. The extremely high lachrymatory action of the present esters is surprising and could not have been anticipated by the rather feeble action which is displayed by the allyl esters, for allyl derivatives are generally known to be irritants, while such properties are not commonly associated with the vinyl group.

The invention is further illustrated, but not limited, by the following examples:

Example 1

A mixture consisting of 252 grams of mucochloric acid, 344 grams of vinyl acetate, 5 grams of mercuric acetate, 0.5 cc. of sulfuric acid and 1 gram of hydroquinone was refluxed for 36 hours on a water bath. At the end of this time the excess vinyl acetate and acetic acid were stripped off under partial vacuum and the residue distilled under a pressure of 21 mm. of mercury. The fraction, B. P. 110°–125° C./21 mm., was collected, washed with dilute hydrochloric acid to precipitate any dispersed mercury. The precipitated mercury was removed by filtering and the resulting filtrate was distilled giving 102 grams of substantially pure vinyl mucochlorate, B. P. 121°–122° C./20 mm., $n_D^{25}$ 1.5028. A sample prepared by this method analyzed for carbon 40.15%, for hydrogen 2.12%, and for chlorine 35.00%, the theoretical values being 40.60%, 1.93% and 34.27%, respectively.

Example 2

A mixture consisting of 225 grams of mucobromic acid, 300 grams of vinyl formate, 5 grams of mercuric formate, 0.5 cc. of sulfuric acid and 1 gram of powdered copper was refluxed for 36 hours on a water bath. At the end of this time the excess vinyl formate and formic acid were stripped off under a partial vacuum and the residue distilled under a pressure of about 21 mm. of mercury. The vinyl mucobromate formed was collected, treated with dilute hydrochloric acid to precipitate any dispersed mercury and filtered to remove the latter and the powdered metal catalyst. The product was characterized by its strong lachrymatory action and by its ability to polymerize to a resin.

With similar results the mucochloric and mucobromic acids may be replaced by the corresponding monohalogen compounds, chloro- or bromo-beta-formylacrylic acid.

Reaction of the vinyl esters of saturated lower aliphatic carboxylic acids with alpha-chloro-beta-bromo-beta-formylacrylic acid or alpha-bromo-beta-chloro-beta-formylacrylic acid results in ester interchange with the production of vinyl chlorobromo-beta-formylacrylate and bromochloro-beta-formylacrylate, respectively.

In the reaction between halogenated beta-formylacrylic acids and vinyl esters of saturated lower aliphatic carboxylic acids there may be used as catalysts mercury salts, particularly mercuric salts, such as mercuric formate, mercuric acetate, mercuric propionate, etc.

As polymerization inhibitors for the reaction hydroquinone, copper powder, copper acetate, sulfur, catechol and other well known inhibitors may be employed.

Example 3

A mixture of 50 grams of vinyl mucochlorate and 0.5 gram of benzoyl peroxide was heated at 40° C. for 3 days. The product obtained was a dark syrup which was poured into alcohol with stirring to precipitate a dark resinous polymer. This polymer was insoluble in dioxane, benzene, alcohol, gasoline, ethylene dichloride, acetone, carbon tetrachloride and ethyl acetate.

Example 4

The polymerization of vinyl mucochlorate was repeated in the absence of a catalyst at a temperature of 110° C. with similar results.

Example 5

A mixture of 50 grams of vinyl mucobromate and 0.5 gram of acetyl peroxide was heated at a temperature of 40° C. for 4 days to produce a polymer of high melting point.

Example 6

50 grams of vinyl chlorobromo-beta-formylacrylate were heated at a temperature of 40° C. to 50° C. for 4 days in the presence of ozone to produce a resinous polymer which possesses a high degree of non-inflammability.

Example 7

A mixture of 50 grams of vinyl chloro-beta-formylacrylate and 0.5 gram of benzoyl peroxide was heated at a temperature of 50° C. for 4 days to produce a resinous polymer.

Example 8

75 grams of vinyl mucochlorate and 25 grams of acrylonitrile were heated at 60° C. in the presence of 1 gram of benzoyl peroxide for 3½ days. A dark resinous solid was formed which was slightly soluble in acetone, insoluble in ethanol, gasoline and carbon tetrachloride and was swollen by acetone.

Example 9

75 grams of methyl acrylate and 25 grams of vinyl mucobromate were heated at a temperature of 40° C. in the presence of 1 gram of benzoyl peroxide for 3 days to form a resinous solid.

The resins prepared in Examples 3 to 9, inclusive, are characterized by substantial insolubility in all the usual organic solvents such as dioxane, benzene, alcohol, gasoline, ethylene dichloride, acetone, carbon tetrachloride and ethyl acetate. They also possess a high melting point and a high degree of non-inflammability. They are useful in the plastic industry generally and are particularly useful as molding compounds and in the preparation of fire resistant coating and impregnating compositions.

Various details of the invention may be varied through a wide range without departing from the principles of this invention and it is, therefore, not my purpose to limit the patent granted hereon otherwise than necessitated by the scope of the appended claims.

What I claim is:

1. A process for preparing esters of halogenated beta-formylacrylic acids which comprises heating in the presence of a catalyst and an inhibitor of polymerization a vinyl ester of a saturated lower aliphatic carboxylic acid with a compound of the general formula:

CHO.CR:CR'.COOH wherein substituents R and R' are selected from the group consisting of Cl and Cl, Br and Br, Cl and Br, Br and Cl, H and Br, H and Cl, Br and H, Cl and H.

2. A process according to claim 1 in which a mercury salt is the catalyst employed.

3. A process according to claim 1 in which mercuric acetate is the catalyst employed.

4. A process according to claim 1 in which vinyl formate is the vinyl ester employed.

5. A process according to claim 1 in which vinyl acetate is the vinyl ester employed.

6. A process according to claim 1 in which vinyl propionate is the vinyl ester employed.

7. A process for preparing vinyl mucochlorate which comprises heating a vinyl ester of a saturated lower aliphatic carboxylic acid with mucochloric acid in the presence of a mercuric salt and an inhibitor of polymerization.

8. A process for preparing vinyl mucobromate which comprises heating a vinyl ester of a saturated lower aliphatic carboxylic acid with mucobromic acid in the presence of a catalyst and an inhibitor of polymerization.

9. A process for preparing vinyl alpha-chloro-beta-formylacrylate which comprises heating a vinyl ester of a saturated lower aliphatic carboxylic acid with alpha-chloro-beta-formylacrylic acid in the presence of a mercuric salt and an inhibitor of polymerization.

10. A vinyl ester of halogenated beta-formylacrylic acids having the general formula:

HCO.CR:CR'.COO.CH:CH₂ where substituents R and R' are selected from the group consisting of Cl and Cl, Br and Br, Cl and Br, Br and Cl, H and Br, H and Cl, Br and H, Cl and H.

11. The compound, vinyl mucochlorate.

12. The compound, vinyl mucobromate.

13. The compound, vinyl alpha-chloro-beta-formylacrylate.

14. A resinous polymer of the compound defined in claim 10.

15. Polyvinyl mucochlorate.

16. Polyvinyl mucobromate.

17. Polyvinyl alpha-chloro-beta-formylacrylate.

RAYMOND B. SEYMOUR.